Patented Aug. 17, 1937

2,090,592

UNITED STATES PATENT OFFICE 2,090,592

PROCESS FOR PRODUCING ALKALI METAL UREAS

Ralph A. Jacobson, Wilmington, Del., assignor to E. I. du Pont de Nemours & Company, Wilmington, Del., a corporation of Delaware No Drawing. Application April 9, 1935, Serial No. 15,425

14 Claims. (Cl. 260—125)

This invention relates to urea derivatives and more particularly to an improved method for producing alkali metal derivatives of urea and incompletely substituted ureas. By the latter term is meant a urea still having at least one replaceable hydrogen atom directly attached to nitrogen.

I have found that when an alkali metal is added to a solution of urea or an incompletely substittued urea in liquid ammonia, and the ammonia subsequently removed, a solid having the the correct analysis for an alkali metal urea or substituted urea is obtained.

Thus, for example, if a gram atom of metallic sodium is added gradually to a solution of a gram mol. of urea in liquid ammonia and left therein for a short time, and the ammonia subsequently removed by distillation, evaporation, filtration, or the like, a reactive white solid, having the correct analysis for monosodium urea, is obtained.

In like manner, I have found that incompletely substituted ureas, (such particularly as contain aryl, acyl, alkyl, aralkyl and like groups) may be similarly treated by alkali metals to produce alkali metal substituted ureas. For example, alkyl ureas, such as methyl and ethyl urea, alkylene ureas such as ethylene urea, acyl ureas such as formyl urea and diacetyl urea, may be utilized according to this invention. Thus, if a gram atom of metallic sodium or other alkali metal is added to a liquid ammonia solution of a gram mol. of a monoacylated urea, a monosodium or a monoalkali metal acyl urea is obtained upon removal of the ammonia. In general, any substituted urea which still contains replaceable hydrogen directly attached to nitrogen may be utilized in accordance with the present invention, or, stated in another way, any urea may be utilized which has at least one amido hydrogen atom.

Although the method of this invention is generally practical at ordinary pressures and temperatures below the boiling point of liquid ammonia, more elevated temperatures and pressures may be employed advantageously for speeding up the reaction. Thus, for example, pressures ranging up to 400 atmospheres and more may be used, if desired.

As a further feature of this invention, I have found that by varying the ratio between the proportions of alkali metal and the urea or a substituted urea having more than one replaceable hydrogen, either a mono- or a poly-alkali metal urea or substituted urea may be produced. Thus, an as example illustrative of this procedure, if two gram atoms of metallic sodium are slowly added to a solution in liquid ammonia of one gram mol. of urea or substituted urea of the mentioned type, I have found that, after removal of the ammonia, there remains a white reactive solid which has the correct analysis for the corresponding disodium derivative.

Substituent groups which may be present in the substituted ureas which I employ may be alkyl, aryl, aralkyl, acyl, alkylene, or cycloparaffin radicals. After treatment of a substituted urea with alkali metal according to this invention, the resulting product will contain both the alkali metal and the substituent group or groups.

The following examples are illustrative of my invention:

*Example 1.*—One hundred twenty grams of urea is dissolved in one and one-half liters of liquid ammonia contained in a two-liter three-necked flask fitted with a mercury sealed stirrer. To this solution is added slowly 46 grams of metallic sodium. The reaction proceeds vigorously as the metallic sodium is first added, but slows down as the addition continues. On completion of the addition of the metallic sodium, the liquid ammonia is removed by distillation, and a reactive white solid analyzing 31.2 per cent nitrogen and 27.85 per cent sodium is obtained. This analysis corresponds satisfactorily with the calculated values for monosodium urea.

I prefer to separate the monosodium urea from the liquid ammonia by filtration, so that the thus recovered liquid ammonia can be reused in subsequent preparations.

*Example 2.*—Six grams of urea is dissolved in one and one-half liters of liquid ammonia contained in a two-liter three-necked flask fitted with a mercury sealed stirrer. To this solution is added slowly 4.6 grams of metallic sodium. The reaction proceeds vigorously as the sodium is first added, but slows down as the addition continues. The solution is allowed to stand overnight, then one and one-half liters of ammonia are added, and the solution allowed to stand at room temperature for eight hours. The ammonia is allowed to evaporate, leaving a white solid whose analysis shows it to be disodium urea.

A dibenzoyl derivative is obtained by reacting 10.4 grams of disodium urea prepared as described above with 28.1 grams of benzoyl chloride. The dibenzoyl urea thus prepared after crystallization from alcohol gives white crystals melting at 204–205° C., and upon analysis are shown to contain 10.7 per cent nitrogen, whereas the theoretical quantity of nitrogen in dibenzoyl urea is 10.4 per cent.

*Example 3.*—To a solution of forty-five grams of phenyl urea dissolved in one liter of liquid ammonia is added 7.6 grams of metallic sodium. The reaction proceeds at first vigorously, but slows down as the addition of metallic sodium is continued. The solution is allowed to stand overnight and the mono-sodium phenyl urea recovered by evaporation of the ammonia.

*Example 4.*—To a solution of 76 grams of thiourea in one and one-half liters of liquid ammonia is added 23 grams of metallic sodium. The reaction is initially vigorous, but slows down as the addition of metallic sodium is continued. The solution is allowed to stand overnight and the product recovered by evaporation of the ammonia. The material thus prepared is a pinkish solid which decomposes at 205-215° C.

*Example 5.*—To fifty grams of benzyl urea dissolved in one and one-half liters of liquid ammonia is added 7.6 grams of metallic sodium. The reaction is at first vigorous, but gradually slows down as the addition of metallic sodium is continued. The solution is allowed to stand overnight, and a white solid which is identified as mono-sodium benzyl urea is recovered by evaporation of the ammonia.

*Example 6.*—To 108 grams of oleoyl urea dissolved in liquid ammonia is added slowly 7.6 grams of metallic sodium. The reaction is at first vigorous, but gradually slows down as the addition of metallic sodium is continued. The solution is allowed to stand overnight, and a white solid identified as mono-sodium oleoyl urea is recovered by evaporation of the ammonia.

*Example 7.*—To 25 grams of methyl urea dissolved in one liter of liquid ammonia is added 7.6 grams of metallic sodium. The reaction is at first vigorous, but gradually slows down as the addition of metallic sodium is continued. The solution is allowed to stand overnight, and a product identified as mono-sodium methyl urea is recovered by evaporation of the ammonia.

*Example 8.*—Sixty grams of urea is dissolved in one and one-half liters of liquid ammonia contained in a two-liter three-necked flask fitted with a mercury sealed stirrer. To this solution is added slowly 39 grams of metallic potassium. The reaction is at first vigorous, but slows down toward the end of the addition of the metallic potassium. On completion of the addition of the metallic potassium the mixture is filtered. The reactive white solid obtained is shown by analyses to be mono-potassium urea. Lithium may be substituted for the potassium of the above example.

I generally prefer to carry out the reaction between the urea or substituted urea and the alkali metal below the boiling point of liquid ammonia, altho the reaction may, in some cases, be carried out advantageously at or above the normal boiling point of ammonia. Generally, also, I prefer for reasons of economy to carry out the reaction in a closed system so that the ammonia used as solvent may be recovered for reuse in subsequent reactions.

Altho the products of this invention have been described as prepared by utilizing ammonia as a solvent it will be understood that other methods may be used, such, for example, as adding the alkali metal to the fused urea, thiourea or substituted urea in proportions varying over the ranges hereinbefore described.

Various changes may be made in the details and methods described without departing from the invention or sacrificing any of the advantages thereof.

I claim:

1. A process for producing sodium urea which comprises reacting metallic sodium with urea in anhydrous liquid ammonia.

2. A process for producing sodium urea which comprises reacting metallic sodium with urea in anhydrous liquid ammonia, and thereafter removing the anhydrous liquid ammonia.

3. A process for producing mono sodium urea which comprises reacting metallic sodium and urea in anhydrous liquid ammonia in the proportions of one gram atom of metallic sodium per one gram mol. of urea.

4. A process for producing disodium urea which comprises reacting metallic sodium and urea in anhydrous liquid ammonia in the proportions of two gram atoms of metallic sodium per one gram mol. of urea.

5. A process for producing mono sodium urea which comprises slowly adding metallic sodium to a liquid anhydrous ammonia solution of urea, in the proportions of about one gram atom of metallic sodium per gram mol. of urea, and thereafter removing the ammonia by distillation.

6. A process for producing mono sodium phenyl urea which comprises slowly adding metallic sodium to a liquid anhydrous ammonia solution of phenyl urea, in the proportions of about one gram mole of metallic sodium per gram mol. of phenyl urea, and thereafter removing the ammonia by distillation.

7. A process for producing mono sodium phenyl urea which comprises slowly adding metallic sodium to a liquid anhydrous ammonia solution of phenyl urea, in the proportions of about one gram mole of metallic sodium per gram mole of phenyl urea, and thereafter removing the sodium urea by filtration.

8. A process for producing alkali metal ureas which comprises reacting in anhydrous liquid ammonia an alkali metal with a urea having at least three amido hydrogen atoms, said urea being further characterized in that any substituent for the remaining amido hydrogen is a monovalent hydrocarbon radical.

9. A process for producing sodium urea which comprises reacting in anhydrous liquid ammonia metallic sodium with a urea having at least three amido hydrogen atoms, said urea being further characterized in that any substituent for the remaining amido hydrogen is a monovalent hydrocarbon radical.

10. A process for producing an alkali metal urea which comprises reacting an alkali metal at a pressure in the range of from atmospheric pressure to about 400 atmospheres with a urea having at least three amido hydrogen atoms, said urea being further characterized in that any substituent for the remaining amido hydrogen is a monovalent hydrocarbon radical.

11. A process for producing monoalkali metal urea which comprises reacting alkali metal and a urea having at least three amido hydrogen atoms in anhydrous liquid ammonia, in the proportions of one gram atom of an alkali metal per gram mol. of the urea, said urea being further characterized in that any substituent for the remaining amido hydrogen is a monovalent hydrocarbon radical.

12. A process for producing dialkali metal urea which comprises reacting alkali metal and a urea having at least three amido hydrogen atoms in anhydrous liquid ammonia and in the proportions of 2 gram atoms of an alkali metal per gram mol. of the urea, said urea being further characterized in that any substituent for the remaining amido hydrogen is a monovalent hydrocarbon radical.

13. A process for producing sodium urea which comprises reacting metallic sodium and a urea having at least three amido hydrogen atoms in anhydrous liquid ammonia and in the proportions of one gram atom of metallic sodium per gram mol. of the urea, said urea being further characterized in that any substituent for the remaining amido hydrogen is a monovalent hydrocarbon radical.

14. A process for producing disodium urea which comprises reacting metallic sodium and a urea having at least three amido hydrogen atoms in anhydrous liquid ammonia and in the proportions of 2 gram atoms of metallic sodium per gram mol. of the urea, said urea being further characterized in that any substituent for the remaining amido hydrogen is a monovalent hydrocarbon radical.

RALPH A. JACOBSON.